(12) United States Patent
Smith et al.

(10) Patent No.: US 9,931,801 B2
(45) Date of Patent: Apr. 3, 2018

(54) PARTITIONED RUBBER-COATED FABRIC

(75) Inventors: Reed E Smith, Simpsonville, SC (US); Cecil Richard Gray, Iva, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 758 days.

(21) Appl. No.: 14/347,989

(22) PCT Filed: Sep. 28, 2011

(86) PCT No.: PCT/US2011/053656
§ 371 (c)(1),
(2), (4) Date: Mar. 27, 2014

(87) PCT Pub. No.: WO2013/048384
PCT Pub. Date: Apr. 4, 2013

(65) Prior Publication Data
US 2014/0230205 A1    Aug. 21, 2014

(51) Int. Cl.
*B29D 30/38*    (2006.01)
*D06B 1/00*     (2006.01)
(Continued)

(52) U.S. Cl.
CPC ............. *B29D 30/38* (2013.01); *B29D 30/46* (2013.01); *D06B 1/00* (2013.01); *D06H 7/00* (2013.01); *B29D 2030/381* (2013.01); *B29D 2030/383* (2013.01); *B29D 2030/422* (2013.01); *B29D 2030/466* (2013.01); *Y10T 428/2457* (2015.01)

(58) Field of Classification Search
None
See application file for complete search history.

(56) References Cited

U.S. PATENT DOCUMENTS 1,560,700 A * 11/1925 Langer .................. B60C 9/0042
                                                 139/383 R
1,992,665 A *  2/1935 Hazell ..................... B29C 70/06
                                                     152/556
(Continued)

FOREIGN PATENT DOCUMENTS

EP       0576861      *  1/1994
EP       1072395 A       1/2001
(Continued)

OTHER PUBLICATIONS

International Search Report and Written Opinion, dated Feb. 21, 2012.

*Primary Examiner* — Shawn Mckinnon
(74) *Attorney, Agent, or Firm* — Frank J. Campigotto

(57) ABSTRACT

In a rubber-coated fabric, a plurality of warp cords is included with a spacing d between, sides of adjacent warp cords, each of the warp cords being coated with a layer of rubber compound, A cut line may further be included that separates groups of the warp cords, each group having a predetermined number of the warp cords. The cut line, may be formed by between 2 and 6 adjacent cut line warp cords, wherein a distance dc, between any two sides of adjacent cut Hue warp cords may be no more than. 50% of d. The layer of rubber compound that coats- the rubber-coated fabric is thin enough to outline the cut line on a surface of the rubber-coated woven fabric.

10 Claims, 3 Drawing Sheets

(51) Int. Cl.
*B29D 30/46* (2006.01)
*D06H 7/00* (2006.01)
*B29D 30/42* (2006.01)

(56) References Cited

U.S. PATENT DOCUMENTS

| | | |
|---|---|---|
| 4,159,394 A | 6/1979 | Ross |
| 4,506,717 A | 3/1985 | Thise-Fourgon |
| 4,724,881 A | 2/1988 | Pogue et al. |
| 5,098,768 A | 3/1992 | Holroyd et al. |
| 2005/0048857 A1 | 3/2005 | Terschueren et al. |

FOREIGN PATENT DOCUMENTS

| | | |
|---|---|---|
| GB | 762983 A | 12/1956 |
| JP | 5591649 A | 1/1980 |
| JP | 2005054292 A | 3/2005 |
| JP | 2010121222 A | 6/2010 |
| JP | 2011001661 A | 1/2011 |
| JP | 2011101922 A | 5/2011 |

\* cited by examiner

PARTITIONED RUBBER-COATED FABRIC

BACKGROUND OF THE INVENTION

Field of the Invention

This invention relates generally rubber-coated fabrics suitable for reinforcement of rubber articles and more particularly to rubber-coated tire cord fabrics.

Description of the Related Art

The tire industry has for many years provided tires constructed with belts for reinforcement. The belts are made of layers of textile or steel wire that have been coated with a rubber composition and they are positioned under the tread to stiffen the tire casing, thereby improving wear performance, handling response, damage resistance and protection of the ply cords from road hazards.

In addition to the belted construction, tires may include a cap ply positioned between the tread and the belts. The cap ply is positioned in the circumferential direction to hold the belts in place and to prevent them from growing or expanding when the tire runs at a high speed and generates heat. The cap ply may be constructed from woven fabrics that have been coated with a rubber composition.

Since the material used to form the cap ply is typically manufactured in large sheets, these sheets must be cut into sections having the proper width for positioning on the tire during the tire build. The industry has sought solutions that improve the manufacturing process of such material to minimize waste.

SUMMARY OF THE INVENTION

Embodiments of the present invention include rubber-coated woven fabric and methods for making such fabric. The rubber-coated woven fabric includes a cut line for aligning a slitting blade that can cut the rubber-coated fabric into strips having a predetermined number of warp cords in each strip.

In particular embodiments of a rubber-coated fabric, a plurality of warp cords is included with a spacing d between sides of adjacent warp cords, each of the warp cords being coated with a layer of rubber compound. A cut line may further be included that separates groups, each group having a predetermined number of the warp cords. The cut line may be formed by between 2 and 6 adjacent cut line warp cords, wherein a distance $d_e$ between any two sides of adjacent cut line warp cords may be no more than 50% of d. The layer of rubber compound that coats the rubber-coated fabric is thin enough to outline the cut line on a top surface of the rubber-coated woven fabric.

In particular embodiments of a method for making a cap ply material for a pneumatic tire, groups of warp cords are set up on a textile loom reed, each group having a predetermined number of warp cords at a selected warp density, for example, of between 60 and 160 warp cords per decimeter at a spacing d between sides of adjacent warp cords. Such methods may further include the step of forming a gap between the groups of warp cords in the reed setup by eliminating a warp cord at the selected warp density.

Other steps may include grouping adjacent cut line warp cords on the textile loom reed that define a side of the gap. The distance $d_c$ between any two adjacent cut line warp cords is less than 50% of d. The method may continue with weaving the fabric with a weft density, for example, of between 3 and 10 weft cords per decimeter and treating the woven fabric with a chemical bath at a set temperature and tension, wherein the application of the set tension at the set temperature closes the gap between the groups.

Particular embodiments may further include the step of coating the woven fabric with a layer of rubber compound, wherein the layer of rubber compound is thin enough to locate a cut line defined on a surface of the rubber-coated woven fabric by the cut line cords.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Embodiments of the present invention include rubber-coated fabrics and methods of their making. The rubber-coated fabrics are useful for reinforcement of rubber articles including pneumatic tires. The fabric includes parallel warp cords that run the length of the fabric and parallel weft cords that run the width of the fabric, the warp cords and weft cords woven together as is known in the textile industry. The fabric is woven on a loom in wide widths of material that is treated to prepare the fabric for the rubber compound coating. The treated fabric is coated with the thin skim of rubber compound and then cut into desired widths for use as reinforcements in rubber articles.

The rubber-coated fabric is cut into the desired widths for use as reinforcement materials with a high degree of precision. The number of warp cords in each strip of the cut reinforcement material has a very low tolerance for variability, typically requiring a set number of cords in each strip plus or minus one warp cord. Cutting the rubber-coated fabric into the proper widths with such tight tolerances is difficult because the warp cords have such a small diameter. Typically in the past, the location of the cuts is determined by counting the individual cords (which are visible through the thin rubber coating) to ensure that each strip of cut reinforcement material has the proper number of reinforcement cords. If the cords are miscounted and the material cut in the wrong location so that a strip contains more or fewer than the desired number of cords, then the resulting strip of reinforcement material become scrap.

One characteristic of the rubber-coated fabric disclosed herein is that the rubber-coated fabric includes a cut line that separates the warp cords into groups having the predetermined number of cords that are desired. The cut line can then be used to position the cutting blade on a slitter that cuts the wide fabric into widths having the correct predetermined number of warp cords. One benefit of the cut line is that the slitter operator no longer needs to count the individual cords to properly position the slitter blade.

Figure 1:
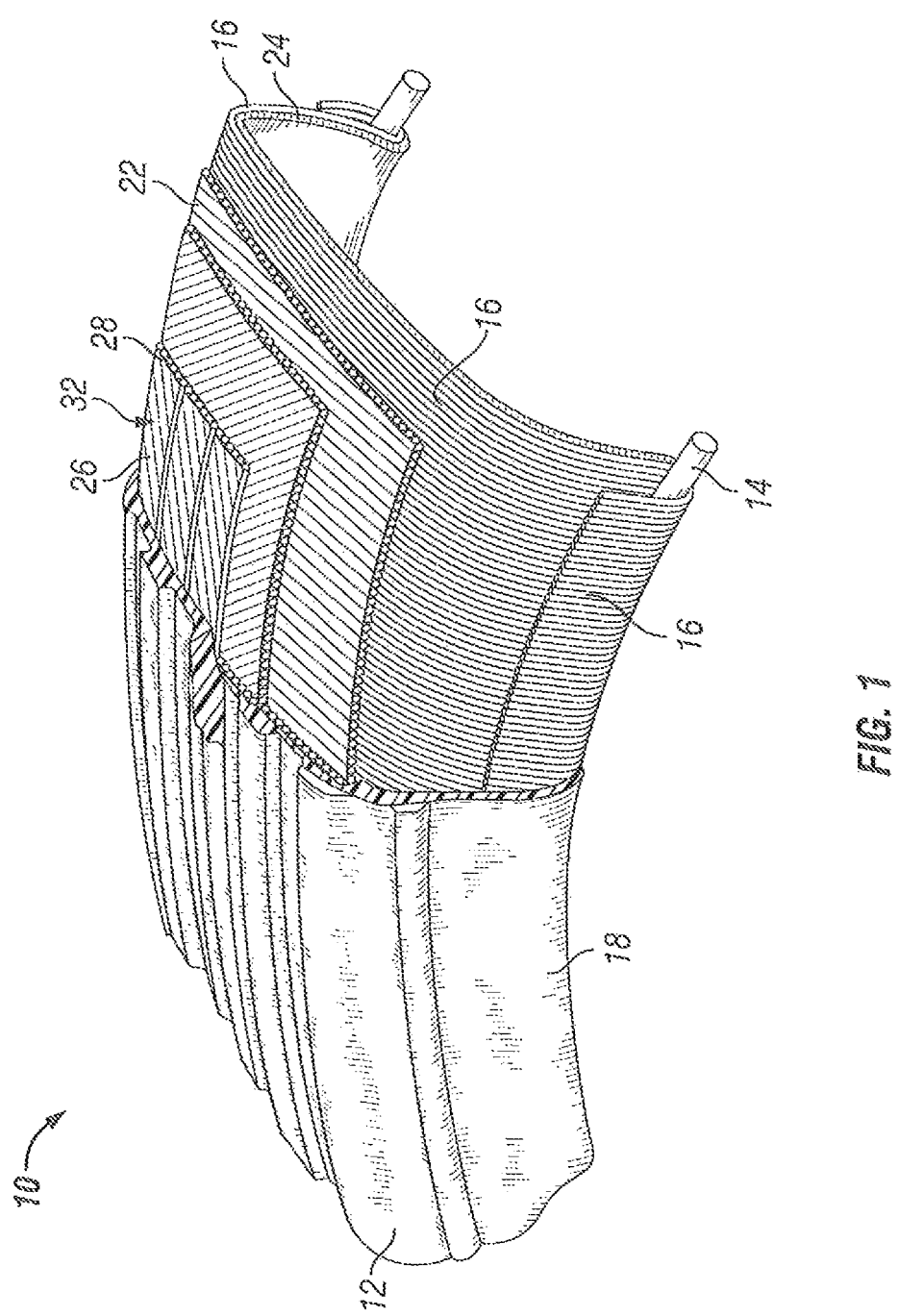
FIG. 1 is a cutaway perspective view of an exemplary pneumatic tire showing many different layers of materials.

As noted, the rubber-coated woven fabric may be used as the cap ply of tires. Pneumatic tires for vehicles are made up of many different layers of different materials. FIG. 1 is a cutaway perspective view of an exemplary pneumatic tire showing many of the different layers of materials, including the cap ply. The tire 10 includes the tread 12 that contacts the road and provides traction and good cornering characteristics. The beads 14 are typically nonextensible steel wire loops that anchor the tire 10 onto a wheel with the rubber skimmed cords assembly 16 extending between the two beads 14. The rubber skimmed cords assembly 16 may be made of textile or steel wires that are encased in a layer of calendered rubber composition (i.e., are encased in a rubber skim) and extend between the beads 14 as the primary reinforcing material of the tire 10. The sidewalls 18 extend between the tread 12 and the beads 14 covering the cords assembly 16 of the tire and serving to protect the cords from damage due to side scuffing as well as assisting in tread 12 support. The belts 22 are layers of steel wire or textile, also covered with a skim of rubber composition, and positioned between the tread 12 and the rubber skimmed cords assembly 16 and serve to stiffen the casing and provide better wear and handling response. The inner liner 24 is typically made of a butyl rubber based material that helps retain the inflation gases inside the tire 10.

The cap ply 26 is shown positioned between the tread 12 and the belt package 22. In this example of a cap ply 26, the cap ply is wound circumferentially about the tire 10 extending from one side of the tire to the other and covering the belt package. The cap ply 26 holds the belts in place and prevents them from growing or expanding when the tire runs at a high speed and generates heat. The cap ply 26 comprises a woven fabric 28 that has been coated with a rubber composition 32.

As is well known in the tire building art, the cap ply may take different forms and the present invention is not limited to any particular positioning or width of the cap ply. For example, in some embodiments the cap ply may have a width that covers the belt package when wrapped once around the tire in a circumferential direction while in other embodiments the cap ply may have a width that covers the belt package only after being spirally wound around the tire in a circumferential direction several times. In other embodiments, the cap ply may only be wrapped around the shoulder area of the tire and/or it may be wound at other than a 0 degree orientation.

Particular embodiments of the present invention include a rubber-coated woven fabric having a cut line separating the warp cords into groups that contain a predetermined number of warp cords. The cut line is formed by two or more warp cords that essentially abut one another along their lengths. Since the rubber-coated fabric is coated with only a very thin skim of rubber compound, the outlines of the warp cords are still visible on the surface of the rubber-coated fabric making the cut line easily distinguishable as the point at which the wide fabric should be cut.

The cords making up the woven fabric may be made of any material, such as synthetic material, natural material or combinations thereof, as may be suitable to meet the design needs as a reinforcement for a given rubber article. The fabric may be woven from synthetic cords, natural cords or combinations thereof. Synthetic cords may be formed, for example, as polyester cords, nylon cords, aramid cords, polyethylene napththalate cords, polyethylene terephthalate cords or combinations thereof. Natural cords may be formed, for example, from cotton cords, rayon cords or combinations thereof.

Likewise the cords making up the woven fabric may be made of any construction and of any thickness as may be suitable to meet the design needs as a reinforcement for a given rubber article. Typically, for a tire application, the cords may be formed, for example, of a flat yarn and may be of a twisted construction. The cords typically may have a diameter, for example, of less than one millimeter. In particular embodiments, examples of suitable cords include those having a diameter of between 0.4 mm and 1 mm or alternatively, between 0.5 mm and 0.9 mm. In particular embodiments, the cords may be formed of materials having a weight, for example, of between 75 tex and 400 tex or alternatively, between 100 tex and 200 tex. Tex is a unit of measure for the linear mass density of a fiber and is defined as the number of grams of the fiber per 1000 meters.

Fabric may be woven at different densities by setting up the loom to have the warp cords closer to one another and/or the weft cords closer to one another. The closer the cords are to one another, the higher the density of the fabric. Measured between adjacent sides of the cords, the cords are separated from one another by a distance d. The warp density and the weft density may be of any density that is suitable to meet the design needs as a reinforcement for a given rubber article. In particular embodiments, the warp density of the woven fabric may be between 60 warp cords per decimeter and 160 warp cords per decimeter or alternatively, between 75 warp cords per decimeter and 120 warp cords per decimeter. Likewise the weft density may be between 3 weft cords per decimeter and 10 weft cords per decimeter or alternatively, between 4 weft cords per decimeter and 8 weft cords per decimeter.

Thus, for example, if the warp cord diameters are 0.5 mm and the warp density is 100 cords per decimeter, then the distance d separating adjacent sides of the cords is about 0.5 mm.

Particular embodiments of the present invention further include methods for making the rubber-coated woven fabric and methods for making a cap ply material for pneumatic tires. In particular embodiments, the cut lines are formed as a result of eliminating a number of warp cords between the groups and further grouping two or more adjacent cut line warp cords that border the gap. Surprisingly, as a result of this elimination, upon treating the fabric to prepare it for the coating of rubber compound, the gap closes and the adjacent cut line warp cords form the cut line.

In setting up a loom for weaving textiles, yarn is pulled from the spools and tied off at the loom reed to establish the warp cord arrangement. Weaving reeds keep the warp cords correctly spaced and are set up to provide the desired warp density of the fabric. During the setup, the warp cords are set at the loom reed at the desired warp density.

The locations for the cut lines in the rubber-coated woven fabric are determined during the reed setup and placed between groups of the warp cords on the textile loom reed, each group having a predetermined number of cords at the selected warp density. Each of these groups is separated from one another by forming a gap between them in the reed setup. These gaps are formed at the desired cut line location in particular embodiments by eliminating, for example, between 1 and 6 warp cords at the selected warp density or alternatively, at least two warp cords, between 2 and 6 warp cords, between 2 and 5 warp cords, between 2 and 4 warp cords or between 3 and 4 warp cords.

In addition to forming the gap, at least two adjacent warp cords on the textile loom reed are grouped together, abutting one another along their adjacent lengths, these adjacent cut line warp cords located at a boundary of the gap and thereby defining a side of the gap. In particular embodiments, the adjacent cut line warp cords may be grouped on either side of the gap or on both sides of the gap. The number of adjacent cut line warp cords in particular embodiments may be, for example, at least 2 cords or alternatively between 2 and 6 cords, between 2 and 3 cords or between 3 and 5 cords.

Figure 2:
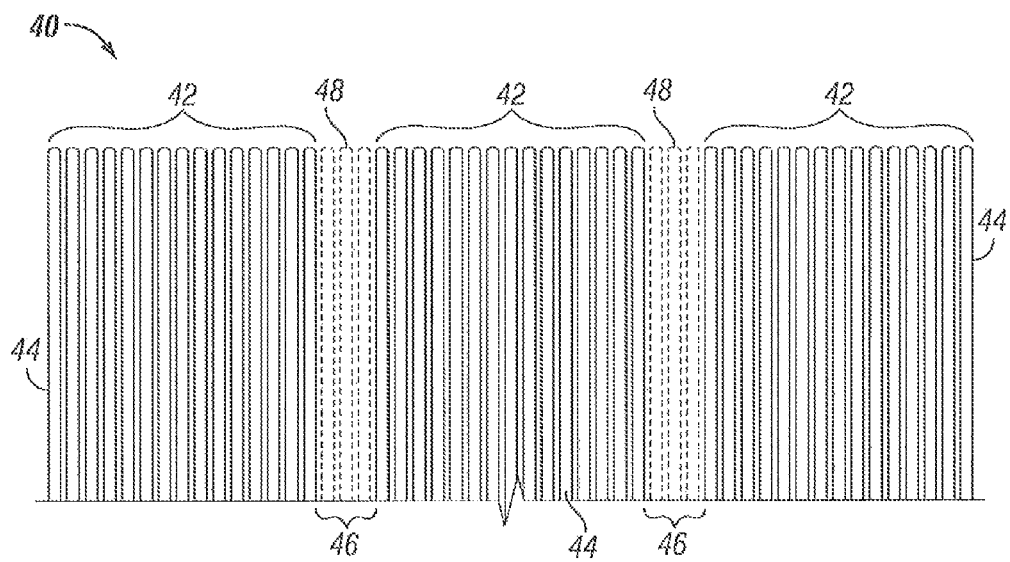
FIG. 2 is a schematic representation of exemplary groups of a predetermined number of warp cords separated by a gap.

FIG. 2 is a schematic representation of exemplary groups of a predetermined number of warp cords separated by a gap. The groups 42 of warp cords each contain a predetermined number of ward cords 44 at a selected warp density, wherein the warp density is a measurement of the number of warp cords per decimeter. Each of the groups 42 of warp cords 44 are separated by a gap 46. The gap 46 is formed by eliminating warp cords that would have been a part of the reed setup had the gap not been created. The eliminated warp cords 48 may be eliminated, for example, by removing them from the reed or by not pulling them into the reed during the reed setup. The eliminated warp cords 48 are typically eliminated at the same warp density as the warp cords 44 in the groups 42. For example, if the gap 46 is created by eliminating three warp cords, the three eliminated warp cords 48, had they not been eliminated, would have been typically, for example, at the same warp density as the remaining warp cords 42. While it may be preferable in some embodiments for each of the groups to have the same predetermined number of cords in each group, the invention includes embodiments wherein one or more of the groups have different predetermined numbers of cords.

In addition to forming the gap 46, warp cords 44 that border the gap 46 are grouped together to form adjacent cut line warp cords 52, essentially abutting one another along their adjacent lengths. In particular embodiments, the adjacent cut line warp cords 52 may be positioned on either side or on both sides of the gap 46. During the weaving process, the cut line warp cords 52 are essentially abutting one another along their adjacent lengths but during the calendering process, some amount of rubber is forced between them as further described below.

After the warp cords have been set on the loom reed at the proper warp density, the gaps have been formed between the groups of ward cords and the bordering adjacent cut line warp cords have been grouped as desired, the weaving process is started as known in the art. Such weaving process includes weaving the fabric with the weft cords across the warp cords at a density of between 3 and 10 weft cords per decimeter. This weft density is low but is sufficient to hold the warp cords into place during the manufacturing of the rubber-coated woven fabric.

After the fabric is woven, the fabric is treated to obtain the desired physical properties of the fabric, such physical properties including its adhesiveness for the rubber compound. The treating step is well known in the industry and includes contacting the fabric with a suitable chemical bath such as resorcinol formaldehyde latex and then heat-setting the material at a predetermined temperature and a predetermined tension.

For example, the untreated fabric may be fed off of a spool and fed into an initial tension and heating zone where the fabric is dipped into the chemical bath at a controlled temperature and tension. The fabric may then be further treated in a second zone where the fabric is dipped into another chemical bath at a controlled temperature and tension. The process temperature may be controlled between 37° C. and 290° C. or alternatively, between 125° C. and 300° C. The tension that the fabric is placed under during treating may be between 220 daN and 6700 daN or alternatively, between 445 daN and 3000 daN.

Surprisingly, as the woven fabric undergoes the treating process under the tension applied to the fabric, the gap that was formed to separate the groups of warp cords having the predetermined number closes so that the spacing between the group of adjacent cut line warp cords that bordered the gap and the other cords is about the same.

Figure 3:
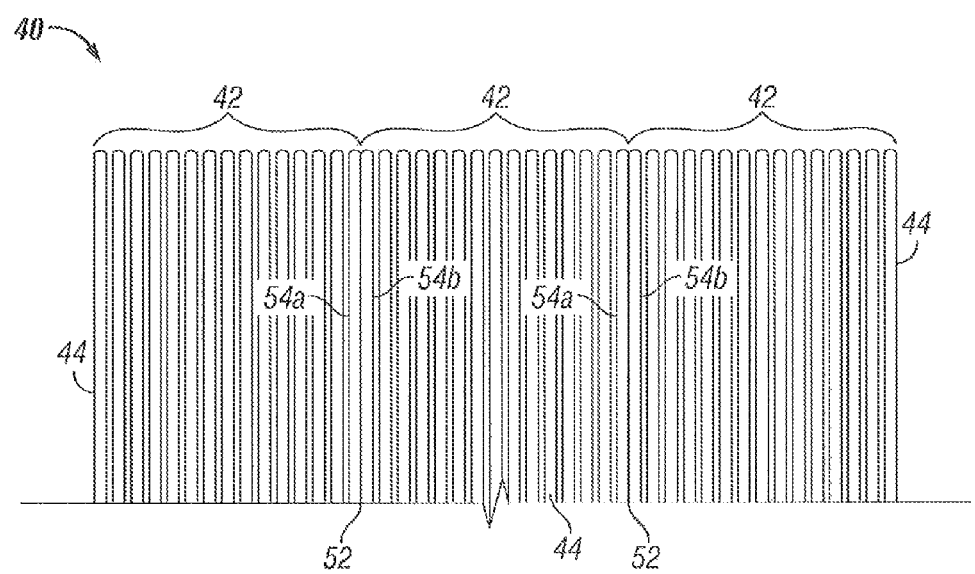
FIG. 3 is a schematic representation of cut lines formed in the woven fabric to separate the exemplary groups of FIG. 2.

FIG. 3 is a schematic representation of the woven fabric after the chemical treatment separated into the exemplary groups shown in FIG. 2. The adjacent cut line warp cords 52, formed by the adjacent cords 54a, 54b, separate the groups 42 of warp cords having the desired predetermined number of warp cords. The gap 46 shown in FIG. 2 is eliminated or nearly eliminated during the treating process as the adjacent cut line warp cords 52 move to close the gap 46.

After the fabric has undergone its treatment process and the gaps between the groups of the predetermined numbers of warp cords have been closed, the woven fabric is coated with a layer of rubber compound. Such coating is applied in a calendering process as is well known in the art. The calendering process includes passing the woven material through rotating rollers that press the rubber compound into, on top of and on the bottom of the woven fabric. The rubber compound is added to an open area between the rollers so that the process is continuous and results in the fabric having a thin layer of rubber compound coating the woven fabric.

The thickness of the rubber compound coating is thin enough to provide an outline of the cords on the surface of the rubber-coated woven fabric. In particular embodiments, the thickness of the rubber compound coating on top of the woven fabric and on the bottom of the woven fabric is, for example, between 0.2 mm and 0.7 mm thick or alternatively between 0.2 mm and 0.5 mm thick.

As the rubber compound is pushed into the fabric by the rollers during the calendering process, the rubber is pushed between the warp cords so each warp cord is coated with the rubber compound. While some of the rubber compound is pushed between the adjacent cut line warp cords during this process, there is not as much rubber compound deposited therebetween because of their abutted arrangement. The distance d filled with the rubber compound between the warp cords is typically much greater than the distance $d_c$ filled with the rubber compound between the adjacent cut line warp cords. In particular embodiments, the distance $d_c$ may be, for example, greater than zero or no more than 50% of d or no more than 25% of d. Alternatively the distance $d_c$ may be, for example, between greater than zero and no more than 70%, no more than 50%, no more than 30%, no more than 25% or no more than 15% of d.

The rubber compound may be of any makeup suitable for the use of reinforcing a rubber article. In particular embodiments, the rubber composition may include natural rubber, a synthetic rubber or combinations thereof. Examples of suitable synthetic rubber include, for example, styrene butadiene rubber, polyisoprene rubber, polybutadiene rubber and so forth. In addition to the rubber component, the rubber compound may further include fillers such as carbon black, silica or combinations thereof. A vulcanization system may also be included in the rubber compound, such system including a vulcanizing agent such as sulfur or a peroxide vulcanizing agent as well as optionally including accelerators and/or stearic acid. Other components may include those known to one having ordinary skill in the art such as one or more of antidegradants, plasticizers, resins and oils.

Figure 4:
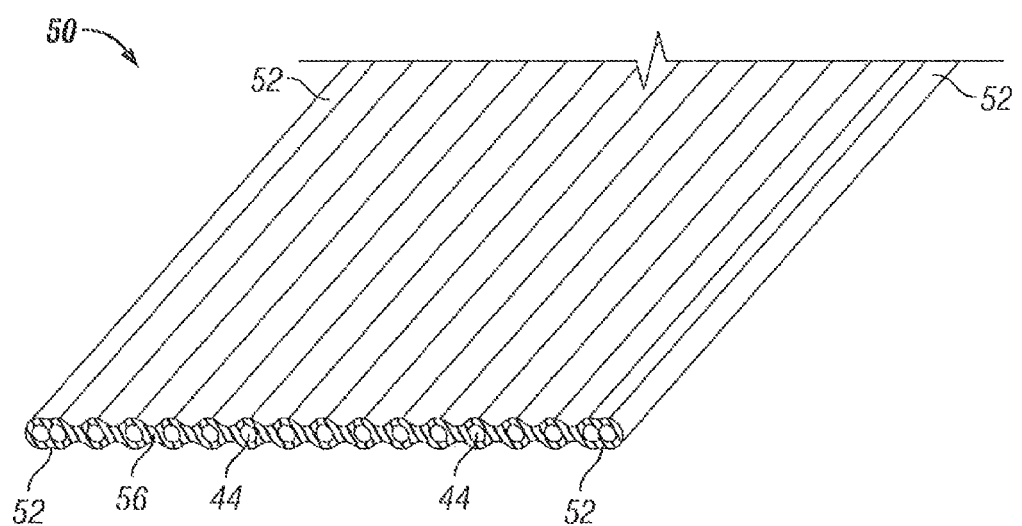
FIG. 4 is a perspective view of an exemplary rubber-coated woven fabric with a cut line.

FIG. 4 is a perspective view of an exemplary rubber-coated woven fabric with a cut line. The rubber-coated woven fabric 50 is coated with the rubber compound 56, coating the top surface of the woven fabric, the bottom surface of the woven fabric and between the cords 44 of the woven fabric. The thickness of the rubber compound 56 is about 0.4 mm on top of the fabric and about 0.4 mm on the bottom of the rubber fabric. Because the rubber coating is so thin, the outline 54 of the cords 44 can be seen through the rubber compound 56. Because the amount of rubber compound pushed between the adjacent cut line warp cords 52 is so much less than between the other cords 44, a well-defined cut line is visible on the surface of the rubber-coated woven fabric. The separation $d_c$ between the adjacent cut line warp cords 52 is much less than the separation d between the warp cords 44. In particular embodiments, the cut line 58 appears as a smoother portion of the surface and provides the indication of where to cut the rubber-coated woven fabric into the properly sized pieces having the predetermined number of warp cords.

Using the cutting line as an indication of the proper location to cut the wide sections of rubber-coated fabric, a blade or other cutting tool can be aligned with the cutting line and used to slit the fabric along the cutting line. The cut may be made on either side of the cutting line as desired to provide the correct number of cords in the resulting strip of rubber-coated fabric. Since the cutting lines separate groups of warp cords having a predetermined number of cords in the group, the resulting cut pieces are known to have the proper number of cords in each piece without having to count the number contained therein.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A rubber-coated woven fabric, comprising:
   two or more groups of adjacent warp cords, each group having a predetermined number of at least 10 of the adjacent warp cords, with a spacing d between sides of the adjacent warp cords, each of the adjacent warp cords being coated with a layer of rubber compound;
   a cut line separating the two or more groups of the adjacent warp cords, the cut line formed by between 2 and 6 adjacent cut line warp cords, wherein a distance $d_c$ between adjacent sides of adjacent cut line warp cords is no more than 50% of d, and wherein the layer of rubber compound is thin enough to make visible the cut line on a surface of the rubber-coated woven fabric.

2. The rubber-coated woven fabric of claim 1, wherein a warp density of the woven fabric is between 60 and 160 warp cords per decimeter.

3. The rubber-coated woven fabric of claim 2, wherein the warp density is between 75 and 120 warp cords per decimeter.

4. The rubber-coated woven fabric of claim 1, wherein a weft density of the woven fabric is between 3 weft cords per decimeter and 10 weft cords per decimeter.

5. The rubber-coated woven fabric of claim 4, wherein the weft density is between 4 and 8 weft cords per decimeter.

6. The rubber-coated woven fabric of claim 1, wherein dc is no more than 25% of d.

7. The rubber-coated woven fabric of claim 1, wherein the cut line is formed by between 2 and 4 cut line warp cords.

8. The rubber-coated woven fabric of claim 1, wherein the woven fabric is woven from synthetic cords, natural cords or combinations thereof.

9. The rubber-coated woven fabric of claim 8, wherein the synthetic cords are polyester cords, nylon cords, aramid cords, polyethylene naphthalate cords, polyethylene terephthalate cords or combinations thereof.

10. The rubber-coated woven fabric of claim 8, wherein the natural cords are cotton cords, rayon cords or combinations thereof.

* * * * *